(12) United States Patent
Lin

(10) Patent No.: US 7,287,333 B1
(45) Date of Patent: Oct. 30, 2007

(54) SIGNAL DETECTING DEVICE

(75) Inventor: Hsien-Mo Lin, Taichung (TW)

(73) Assignee: Her Yuan Chyun Co., Ltd., Taichung (TW)

( * ) Notice: Subject to any disclaimer, the term of this patent is extended or adjusted under 35 U.S.C. 154(b) by 21 days.

(21) Appl. No.: 11/436,866

(22) Filed: May 19, 2006

(51) Int. Cl.
*G01B 7/30* (2006.01)

(52) U.S. Cl. .................................... 33/1 PT

(58) Field of Classification Search ............... 33/1 PT, 33/1 N, 534, 706, 708; 324/207.24, 207.25; 200/19.18, 291
See application file for complete search history.

(56) References Cited

U.S. PATENT DOCUMENTS

| | | | | |
|---|---|---|---|---|
| 4,193,199 A | * | 3/1980 | Whiteley et al. | 33/1 PT |
| 4,719,449 A | * | 1/1988 | Cousseau | 341/13 |
| 5,311,666 A | * | 5/1994 | Jacobsen et al. | 33/1 PT |
| 5,446,966 A | * | 9/1995 | Ishizaki | 33/1 PT |
| 6,288,653 B1 | * | 9/2001 | Shih | 341/35 |
| 6,311,401 B1 | * | 11/2001 | Neckel et al. | 33/1 PT |
| 6,630,823 B2 | * | 10/2003 | Tateishi et al. | 324/207.25 |
| 6,973,731 B2 | * | 12/2005 | Aikawa et al. | 33/1 PT |
| 2002/0020070 A1 | * | 2/2002 | Takeuchi | 33/1 PT |

* cited by examiner

*Primary Examiner*—Christopher W Fulton
(74) *Attorney, Agent, or Firm*—Egbert Law Offices

(57) ABSTRACT

The present invention is a signal detecting device, which includes a casing, drive unit, feeding strip and transmitting strip. The signal detecting section of transmitting strip coincides with the movement path of the transmitting section of the conducting disc, and the transmitting strip is also fitted with some spacing grooves and flanges. Thus, the conducting signal will occur if the transmitting section of the conducting disc is aligned with the flanges or grooves. So, digital signal output is guaranteed to significantly improve the section detecting accuracy. Based upon the detecting unit, it is possible to ensure real-time error detection and automatic correction or resetting.

11 Claims, 13 Drawing Sheets

SIGNAL DETECTING DEVICE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a signal detecting device, and more particularly to an innovative one which ensures digital signal output for a higher degree of section detecting accuracy.

BACKGROUND OF THE INVENTION

Signal detecting devices are commonly applied to detect signals for a variety of applications, for example, detecting resistance signals of magnetic controllers of fitness equipment. In such cases, the signal detecting device is mounted into a motor drive mechanism of a magnetic wheel, such that it can sense the operating state of this mechanism and transmit a signal to a predefined controller, and then convert it into some segment data (e.g. 1, 2, 3 , , , ). The signal detecting device is typically used to input a voltage, and with the help of a variable resistance, generate an analog signal output due to action of voltage drop. For such a conventional signal detecting device, signal acquisition is achieved by sensing the resistance value. However, linear characteristics of resistance often lead to instability and loss of sensing linearity for a resistance value. And, there is not an obvious sectional division among variable resistance values. Thus, a bigger error of sectional values will likely occur if a controller interprets and converts analog signals. This cannot satisfy the demands of this industry for high-end and economical products.

For this reason, a sensing error cannot be detected and located through this structural design on a real-time basis. In such case, progressive errors will lead to a sharp difference of sectional values of a controller versus actual operating sections of a mechanism. In the case of failure of a typical signal detecting device, the controller should be manually reset (e.g. "reset" button), leading to the shortcoming of poor time efficiency and untimely troubleshooting.

Thus, to overcome the aforementioned problems of the prior art, it would be an advancement in the art to provide an improved structure that can significantly improve the efficacy.

To this end, the inventor has provided the present invention of practicability after deliberate design and evaluation based on years of experience in the production, development and design of related products.

BRIEF SUMMARY OF THE INVENTION

Based upon innovative design of a signal detecting device of the present invention, grooves and flanges are alternatively arranged at the movement path of a conducting disc. A conducting signal will occur if a transmitting section of the conducting disc is aligned with the flanges or grooves. This makes it possible to output digital signals and improve significantly the section detecting accuracy.

In addition, the present invention is additionally designed with a detecting unit. So, when the transmitting section of the conducting disc is contacted with detecting terminal of the detecting unit, the detecting unit will output this signal to a predefined controller via signal output terminal, thus enabling real-time error detection and automatic correction or resetting of sections by the controller.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
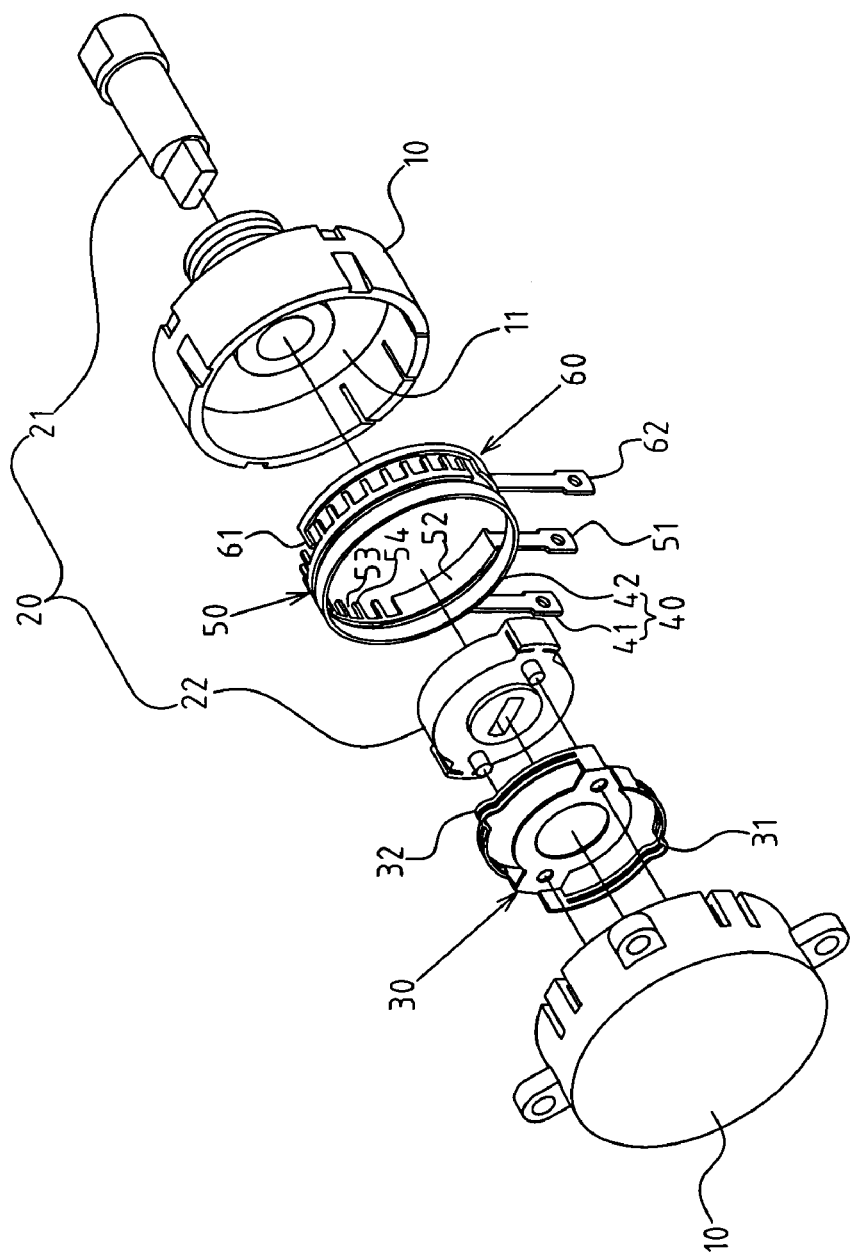
FIG. 1 shows an exploded perspective view of the preferred embodiment of signal detecting device of the present invention.
Figure 2:
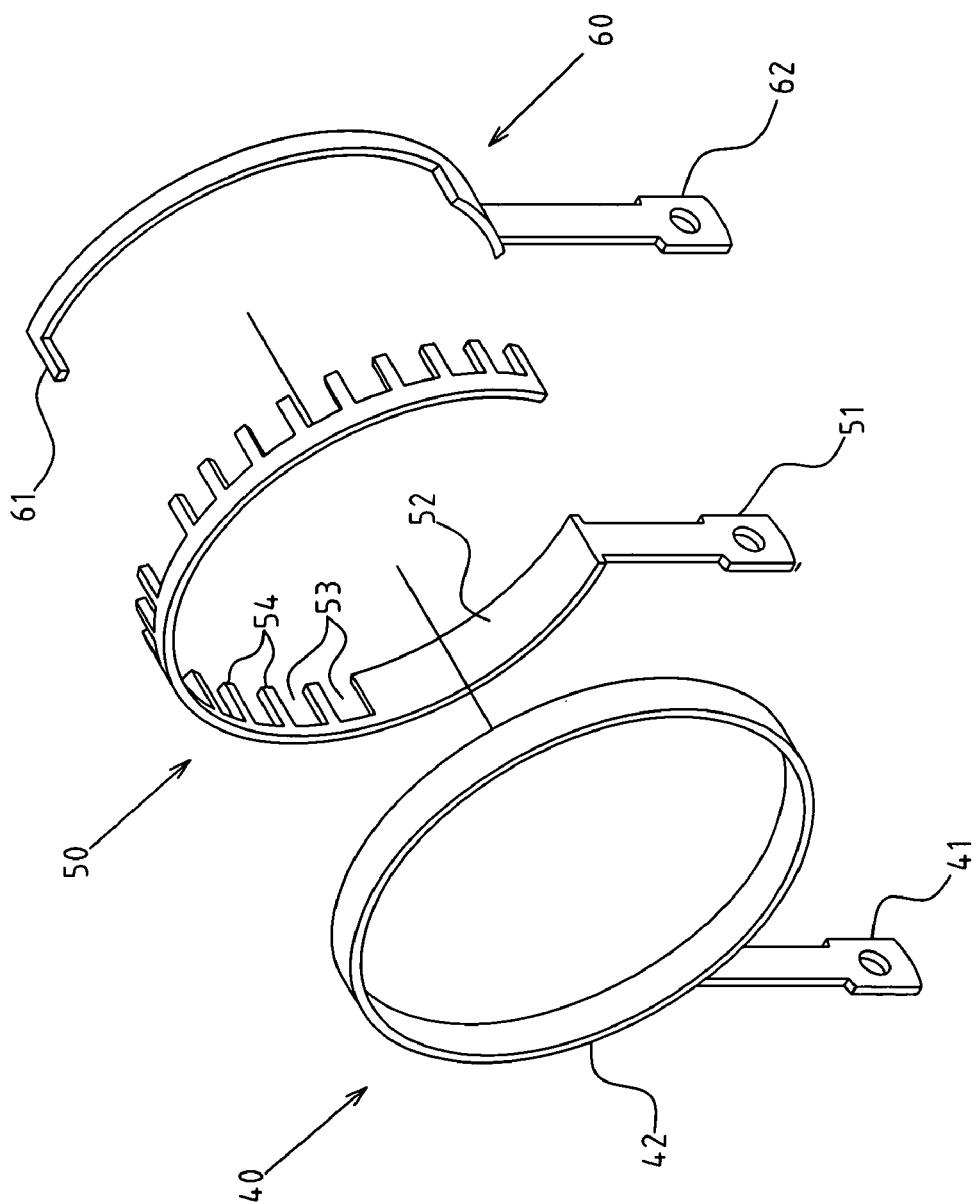
FIG. 2 shows an exploded partial perspective view of the preferred embodiment of signal detecting device of the present invention.
Figure 3:
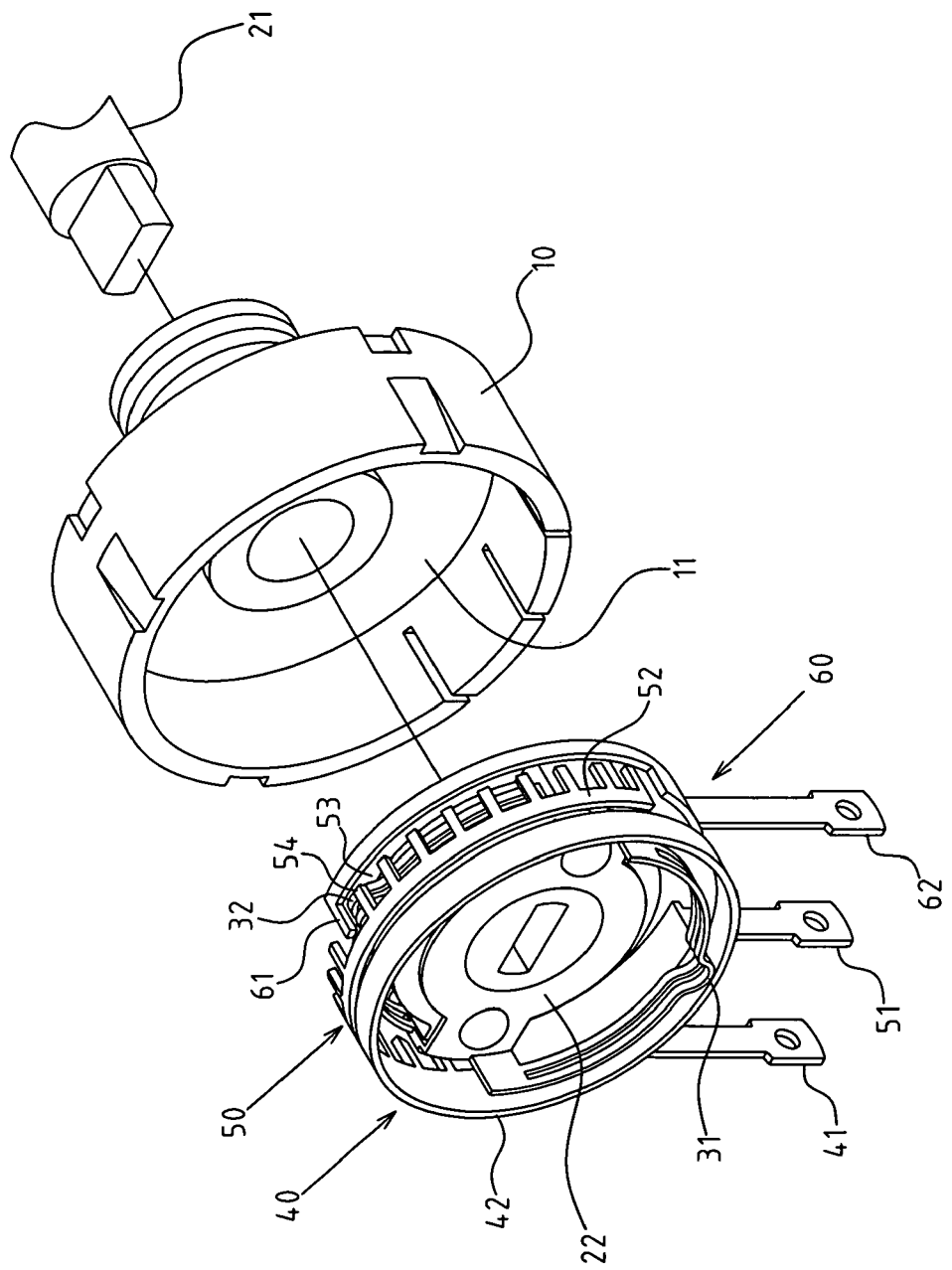
FIG. 3 shows a partial perspective view of the preferred embodiment of signal detecting device of the present invention.

FIGS. 1, 2, 3 depict preferred embodiments of the present invention, which are provided for only explanatory purposes with regard to the claims.

The signal detecting device comprises a casing 10, which is designed into a cylinder with a chamber 11.

The present invention includes a rotary drive unit 20, which consists of a drive axle 21 protruding from casing 10, and a swivel base 22 within chamber 11 of casing 10. The swivel base 22 is equipped with a conducting disc 30 that rotates synchronously with swivel base 22. A feeding section 31 and a transmitting section 32 are oppositely placed at a predefined cycle of conducting disc 30.

A feeding strip 40 consists of a feeding terminal 41 and a conducting section 42. The conducting section 42 is designed to coincide with the circular path of feeding section 31 of the conducting disc 30 (conducting section 42 is a ring in the present invention), such that conducting section 42 of feeding strip 40 is normally contacted with feeding section 31 of conducting disc 30.

A transmitting strip 50 consists of a transmitting terminal 51 and a signal detecting section 52. The curved signal detecting section 52 is designed to coincide with the circular path of transmitting section 32 of the conducting disc 30, and is also fitted with some spacing grooves 53 and spacing flanges 54. When transmitting section 32 of conducting disc 30 is aligned with the flange 54 or groove 53, a digital signal output (1 or 0) is generated.

At least a detecting unit 60 consists of a detecting terminal 61 and a signal output terminal 62. The detecting terminal 61 is aligned with a predefined position on transmitting section 32 of conducting disc 30, but not connected with signal detecting section 52 of transmitting strip 50. When transmitting section 32 of conducting disc 30 is contacted with detecting terminal 61 of detecting unit 60, the detecting unit 60 will output this signal to a predefined controller via signal output terminal 62, thus making it possible to detect the signal and enable resetting by a controller.

Based upon above-specified structural design, the present invention is operated as described below.

Figure 4:
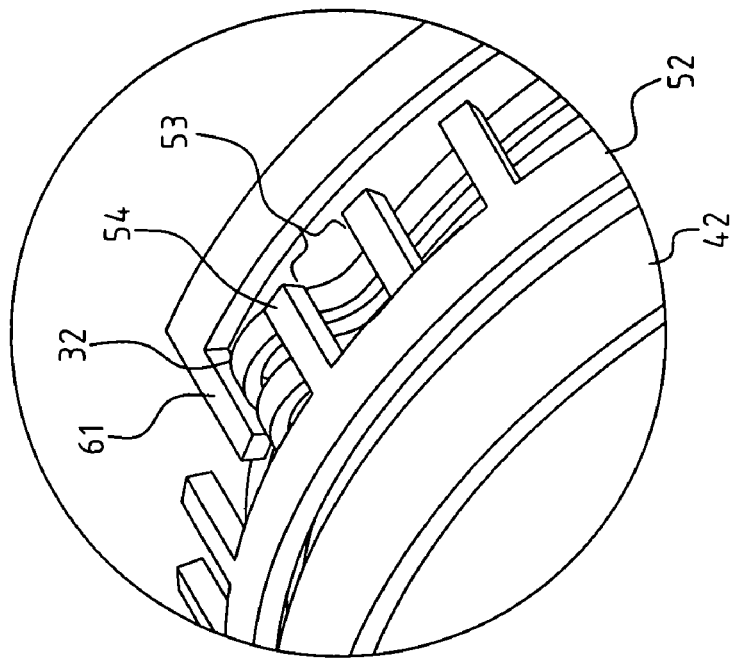
FIG. 4 shows an isolated perspective view of the operation of the present invention.
Figure 5:
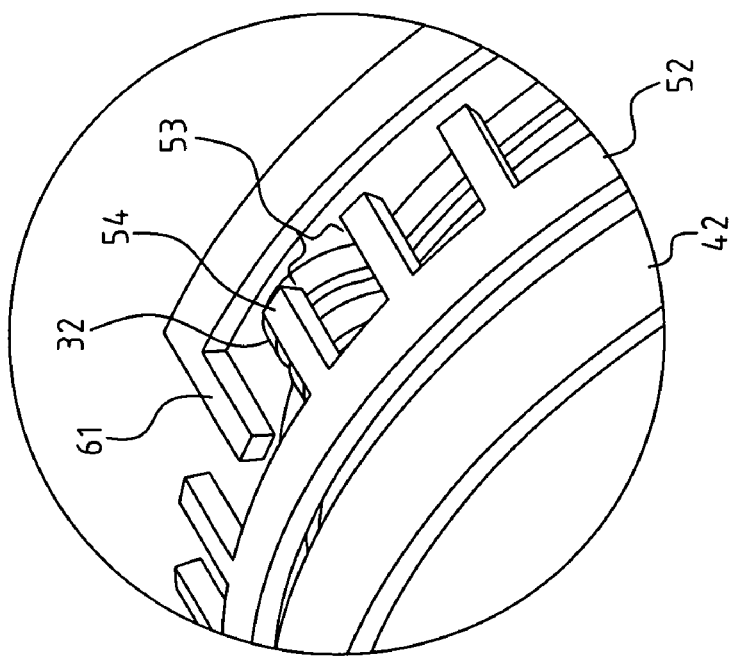
FIG. 5 shows another isolated perspective view of the operation of the present invention.
Figure 6:
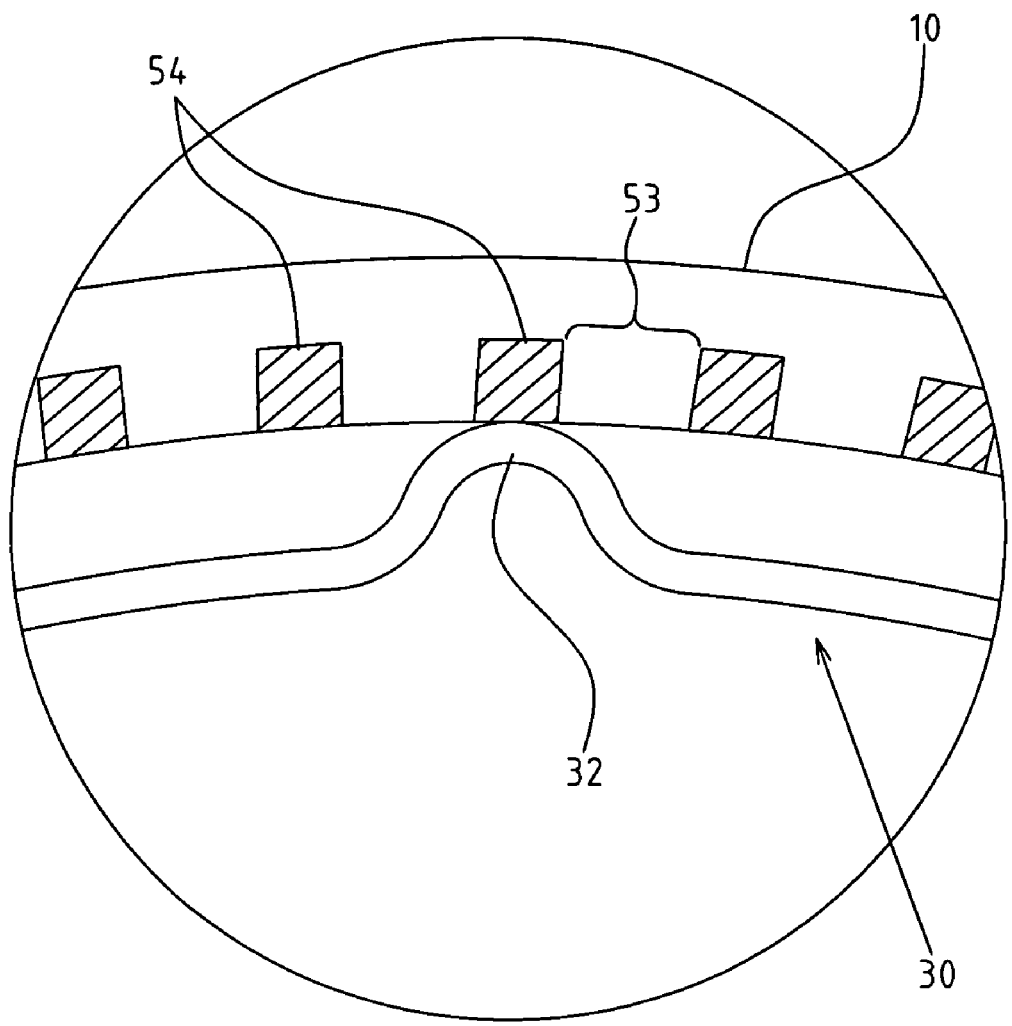
FIG. 6 shows an isolated schematic view of the flange embedded into the casing in the present invention.

Referring to FIGS. 1, 2, and 3, when the signal detecting device of the present invention is used to detect a resistance signal of a magnetic controller of fitness equipment, the drive axle 21 of rotary drive unit 20 is linked to the drive mechanism of the magnetic controller. Meanwhile, feeding terminal 41 of feeding strip 40, transmitting terminal 51 of transmitting strip 50 and signal output terminal 62 of detecting unit 60 are linked to the controller of the fitness equipment. When the fitness equipment is activated, the drive axle 21 of signal detecting device will be driven to actuate the swivel base 22 and conducting disc 30. In such case, feeding section 31 of conducting disc 30 is normally in contact with conducting section 42 of feeding strip 40. But, the contact state between transmitting section 32 of conducting disc 30 and signal detecting section 52 of transmitting strip 50 differs a little due to alignment with flange 54 or groove 53. As illustrated in FIG. 4, transmitting section 32 of conducting disc 30 is aligned with flange 54 of signal detecting section 52. In such a case, an input signal will be fed back to the controller via transmitting terminal 51 of transmitting strip 50. As also illustrated in FIG. 5, transmitting section 32 of conducting disc 30 is aligned with groove 53 of signal detecting section 52. In such a case, the input signal cannot be fed back to the controller due to signal interruption. Since flange 54 and groove 53 arranged alternatively will rotate with conducting disc 30, the controller can obtain a digital signal of 0, 1, 0, 1, thereby achieving accurate segment data through accumulative computation. As illustrated in FIG. 6 (referring also to FIG. 3), the flange 54 of signal detecting section 52 of transmitting strip 50 can be embedded into casing 10. So, when transmitting section 32 of conducting disc 30 is aligned with the groove 53 of signal detecting section 52, the inner wall of casing 10 is contacted.

Referring to FIGS. 1, and 3, the feeding strip 40 and transmitting strip 50 are coaxially but alternatively arranged, such that conducting disc 30 is axially placed into feeding strip 40 and transmitting strip 50. Feeding section 31 of conducting disc 30 and feeding strip 40, or transmitting section 32 and transmitting strip 50 are radially and oppositely arranged, while conducting section 42 of feeding strip 40 and the flange 54 of transmitting strip 50 and detecting unit 60 are axially extended.

Figure 7:
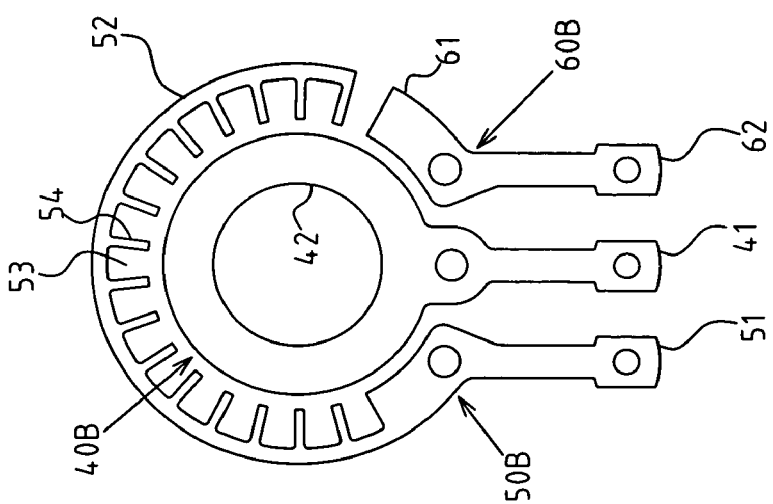
FIG. 7 shows a schematic view of the feeding strip, transmitting strip, and detecting unit of the present invention.
Figure 10:
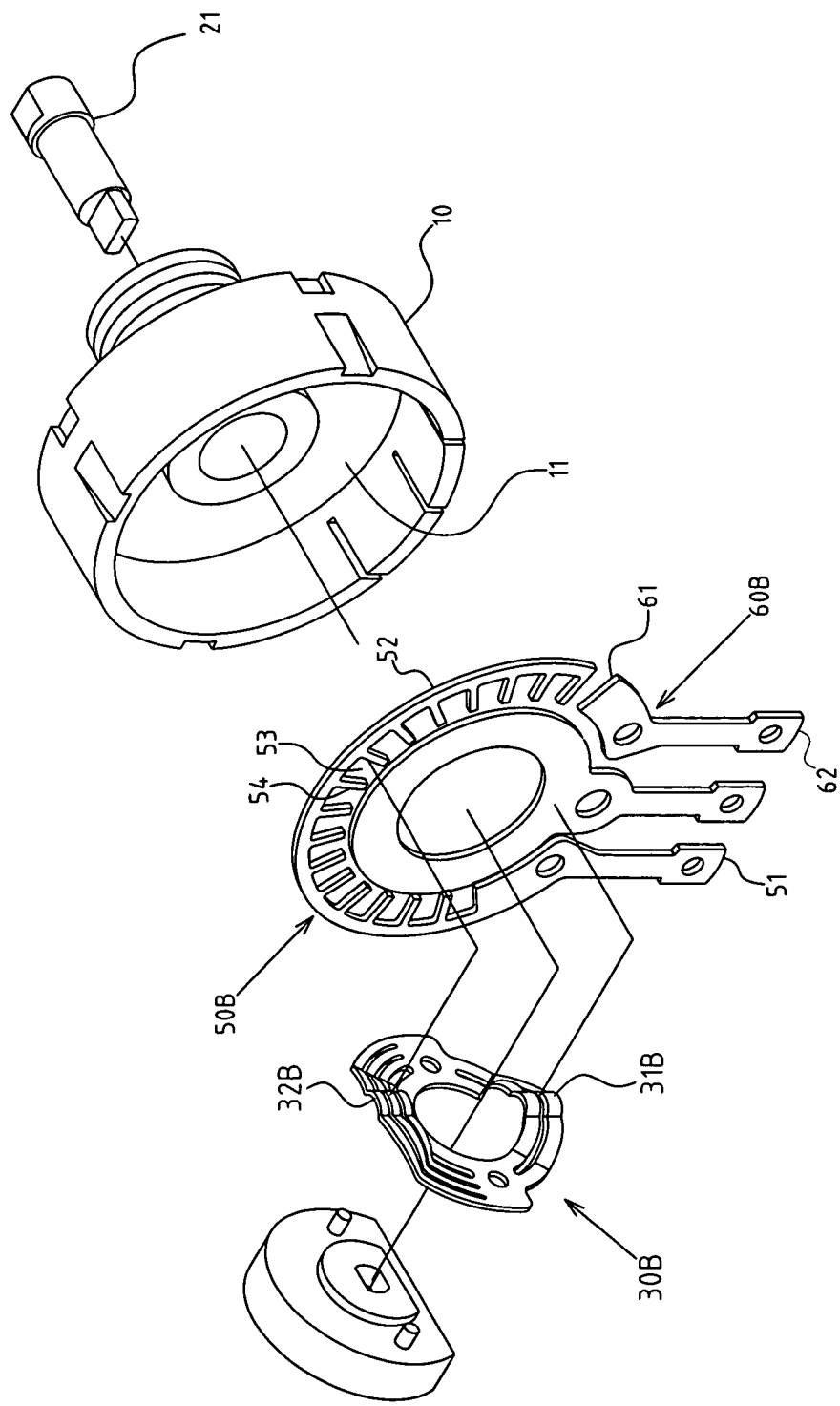
FIG. 10 shows another exploded perspective view (corresponding to FIG. 7) of the feeding strip, transmitting strip, and detecting unit of the present invention.
Figure 11:
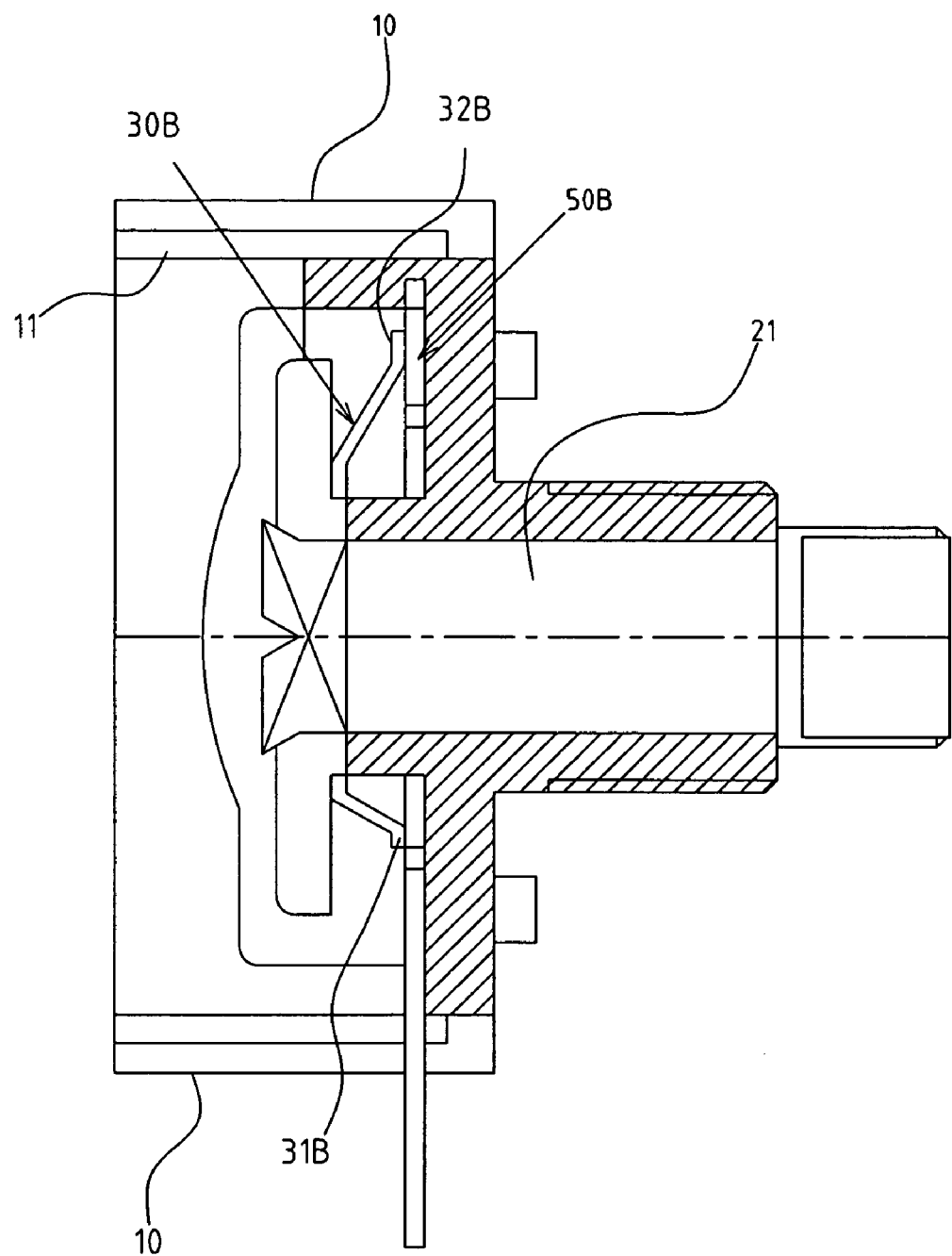
FIG. 11 shows a sectional view of FIG. 7.

Referring also to FIGS. 7, 10, 11, conducting section 42 of feeding strip 40B and the flange 54 of transmitting strip 50B and detecting unit 60B are axially extended.

Figure 9:
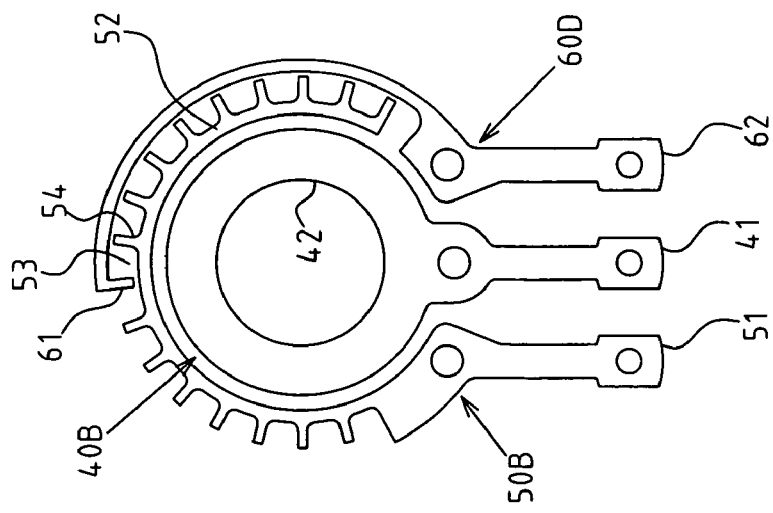
FIG. 9 shows another schematic view of the operation of the detecting unit of the present invention.
Figure 8:
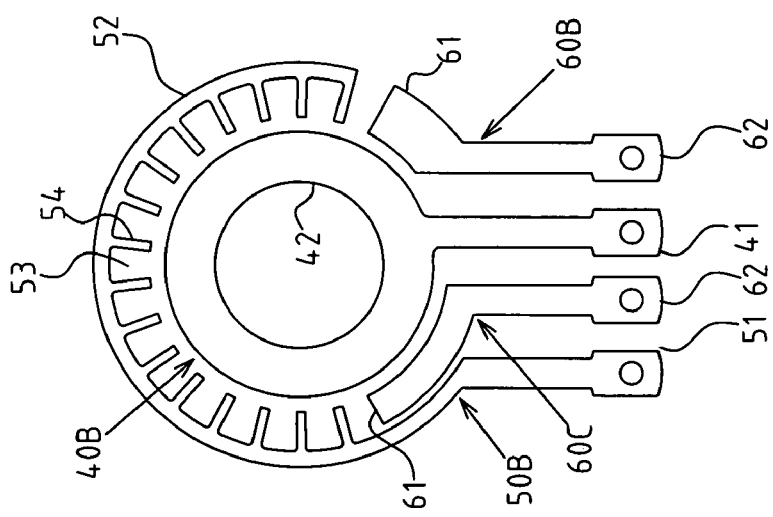
FIG. 8 shows a schematic view of the operation of the detecting unit of the present invention.

One preferred embodiment of signal detecting unit is described in FIGS. 7, 10, and 11. First, the detecting unit 60B is mounted onto the end of signal detecting section 52 of transmitting strip 50B. Referring to FIG. 8, detecting unit 60B, 60C is separately mounted onto the end and top of signal detecting section 52 of transmitting strip 50B. Referring also to FIG. 9, detecting unit 60D is mounted onto middle section of signal detecting section 52 of transmitting strip 50B.

Figure 12:
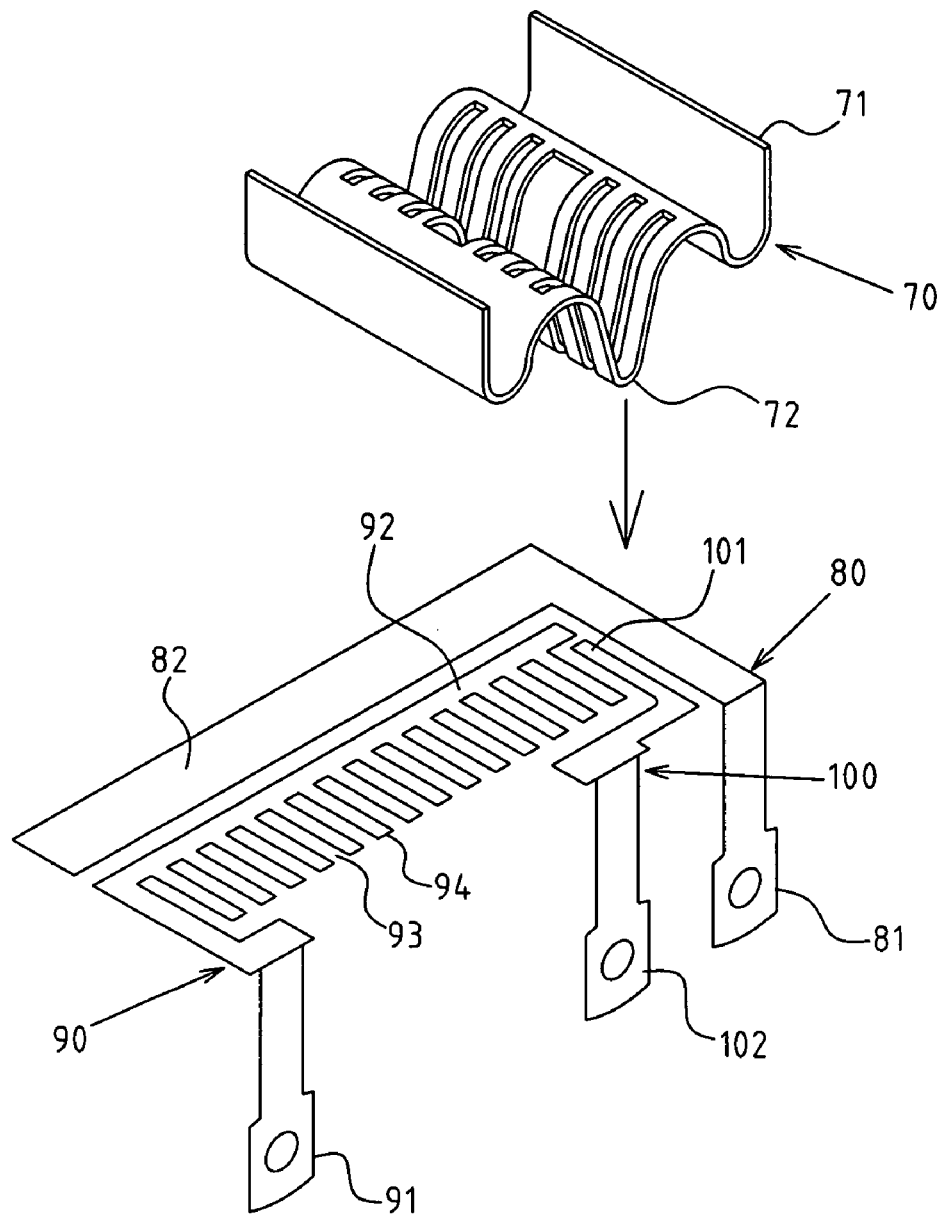
FIG. 12 shows another perspective view of the feeding strip, transmitting strip, and detecting unit of the present invention.
Figure 13:
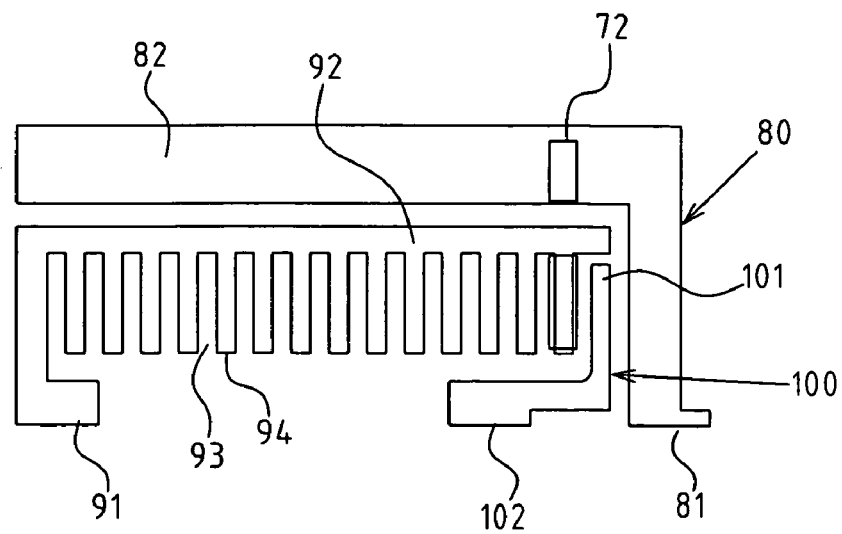
FIG. 13 shows a schematic view of the feeding strip, transmitting strip, and detecting unit of the present invention.
Figure 14:
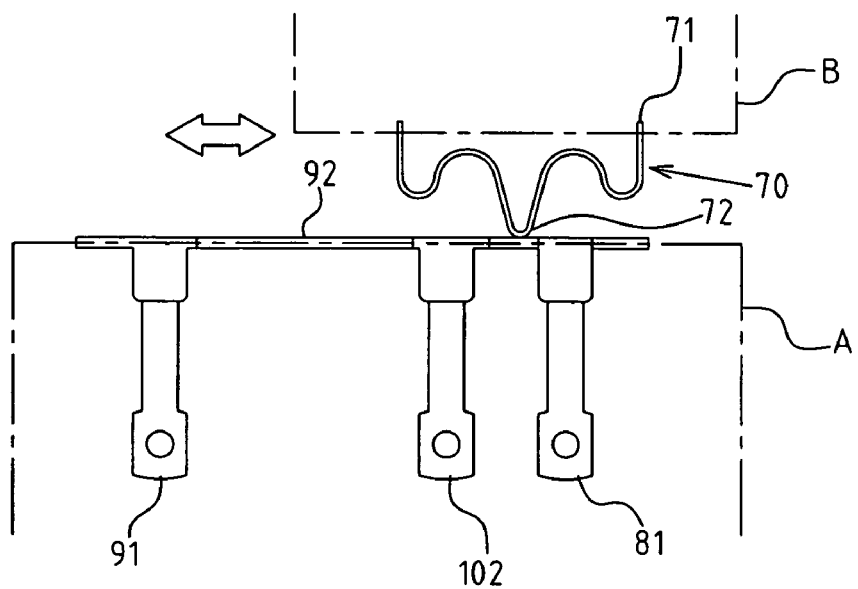
FIG. 14 shows a schematic view of the feeding strip, transmitting strip, and detecting unit of the present invention.

Referring to FIGS. 12, 13, 14, another preferred embodiment of signal detecting device is characterized by a translational drive unit 70, which consists of a drive section 71 and a conducting section 72. The translational drive unit 70 reciprocates along a predefined path.

The feeding strip 80 consists of a feeding terminal 81 and a conducting section 82, of which the conducting section 82 is installed to coincide with the shifting path of the translational drive unit 70, such that conducting section 82 of feeding strip 80 is normally in contact with conducting section 72 of translational drive unit 70.

The transmitting strip 90 consists of a transmitting terminal 91 and a signal detecting section 92, of which the signal detecting section 92 is installed to coincide with the path of conducting section 72 of the translational drive unit 70, and also fitted with some spacing grooves 93 and spacing flanges 94.

At least a detecting unit 100 consists of a detecting terminal 101 and a signal output terminal 102, of which the detecting terminal 101 is aligned with a predefined location on the path of conducting section 72 of translational drive unit 70. When conducting section 72 of translational drive unit 70 is in contact with detecting terminal 101 of detecting unit 100, the detecting unit 100 can output the signal to a predefined controller via signal output terminal 102.

In another preferred embodiment of the present invention, the feeding strip 80 and transmitting strip 90 are horizontally but alternatively arranged. Also, the feeding strip 80, transmitting strip 90 and detecting unit 100 are mounted onto the first object A (as illustrated in FIG. 14), while translational drive unit 70 is mounted onto the second object B. Owing to relative reciprocating movement of two objects A, B, it is possible to enable a predefined reciprocating movement of translational drive unit 70. The above-specified objects A, B are a fixed part and a mobile part of a magnetic member of fitness equipments.

Figure 15:
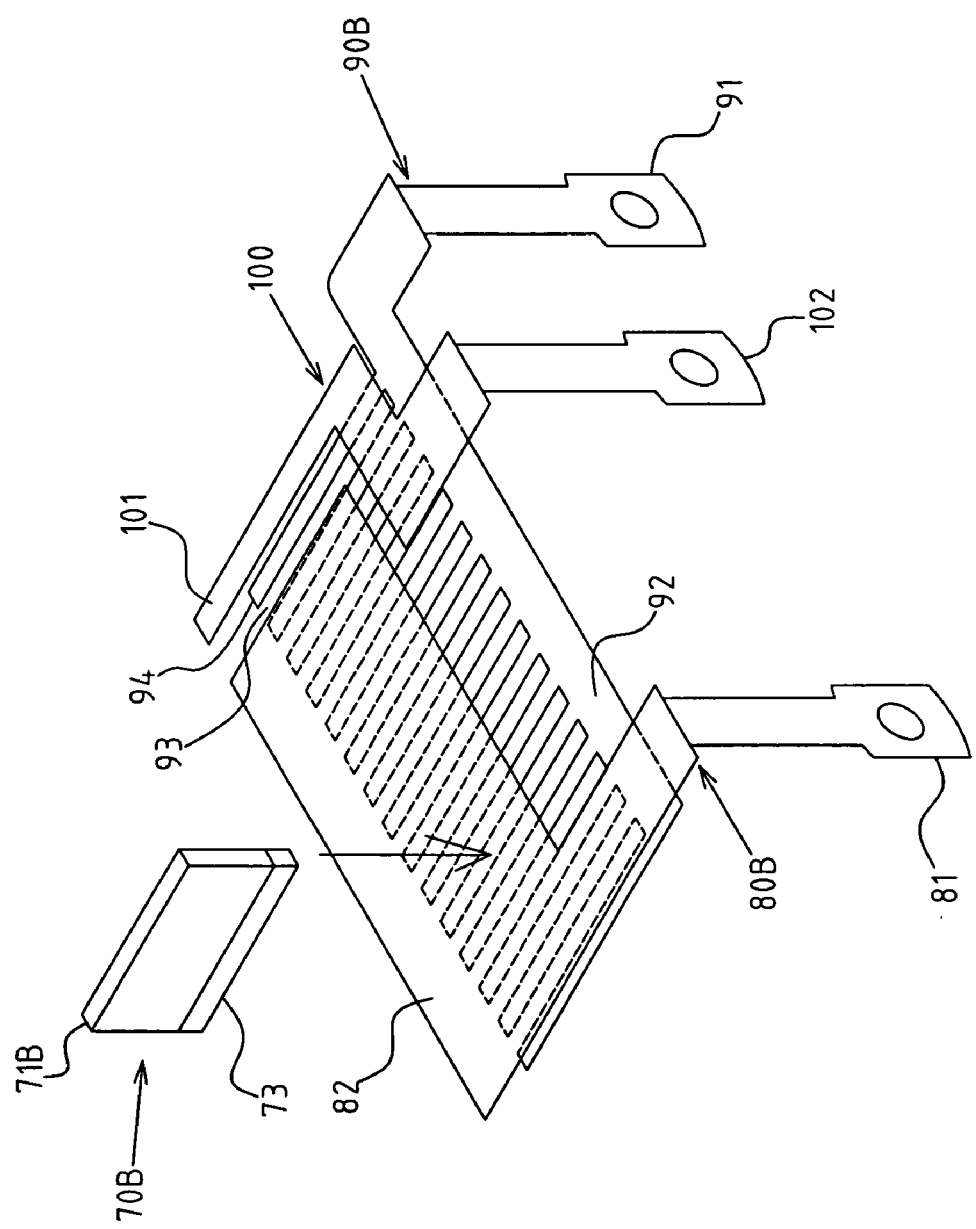
FIG. 15 shows a perspective view of the feeding strip, transmitting strip, and detecting unit of the present invention.
Figure 16:
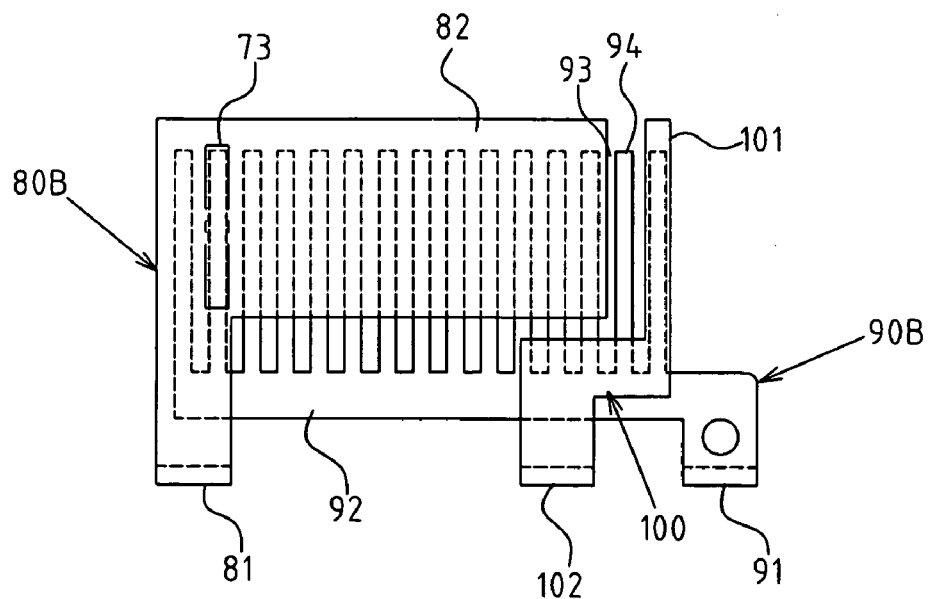
FIG. 16 shows a vertical schematic view of the feeding strip, transmitting strip, and detecting unit of the present invention.
Figure 17:
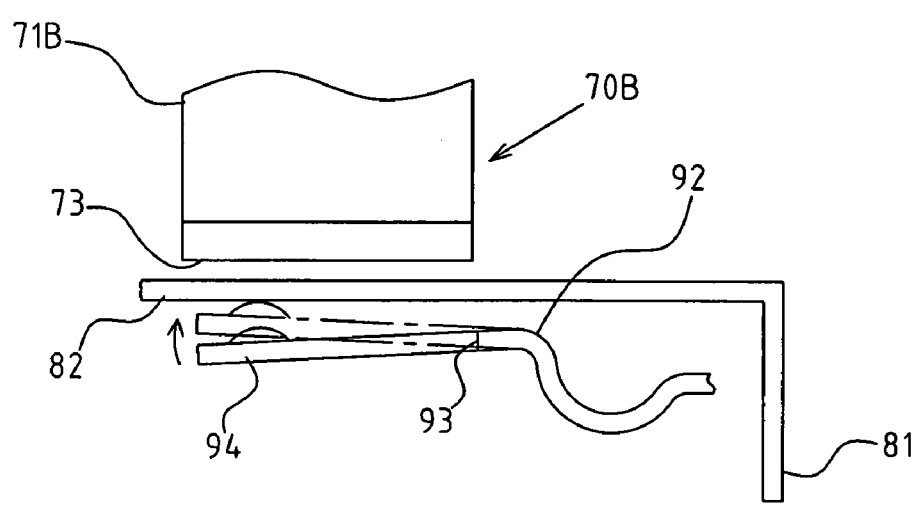
FIG. 17 shows a lateral schematic view of the feeding strip, transmitting strip, and detecting unit of the present invention.

In another preferred embodiment of signal detecting device, the translational drive unit 70, feeding strip 80, transmitting strip 90 and detecting unit 100 are contact-type structural members. As such, the translational drive unit 70 is electrically linked to feeding strip 80 and transmitting strip 90, or feeding strip 80 and detecting unit 100. Referring to FIGS. 15, 16, 17, translational drive unit 70B comprises a drive section 71B and a detecting section, of which the detecting section is a magnetic sucker 73 in the present invention. The conducting section 82 of feeding strip 80B is placed oppositely to magnetic sucker 73 of translational drive unit 70B in a non-contact state. The transmitting strip 90B is placed at one side of feeding strip 80B far away from magnetic sucker 73 in a similar way. And, signal detecting section 92 of transmitting strip 90B presents magnetic property or magnetic conductivity. Therefore, when magnetic sucker 73 of translational drive unit 70B is aligned with flange 94 of signal detecting section 92, the end of flange 94 will be stopped at conducting section 82 of feeding strip 80B, thus enabling electrical connection of transmitting strip 90B and feeding strip 80B (generating digital signal 1)(referring to FIG. 17). When magnetic sucker 73 is aligned with groove 93 of signal detecting section 92, the end of flange 94 will be separated from conducting section 82 of feeding strip 80B (generating digital signal 0).

The above-specified detecting unit 100 and translational drive unit 70B can also be designed into a non-contact state. So, the detecting unit 100 is mounted laterally onto feeding strip 80B far away from magnetic sucker 73. The detecting terminal 101 presents magnetic property or magnetic conductivity. Therefore, when magnetic sucker 73 is aligned with detecting terminal 101 of detecting unit 100, the detecting terminal 101 will be stopped at conducting section 82 of feeding strip 80B, thus enabling electrical connection of detecting unit 100 and feeding strip 80B. Then, the detecting unit 100 will output the signal via its signal output terminal.

Figure 18:
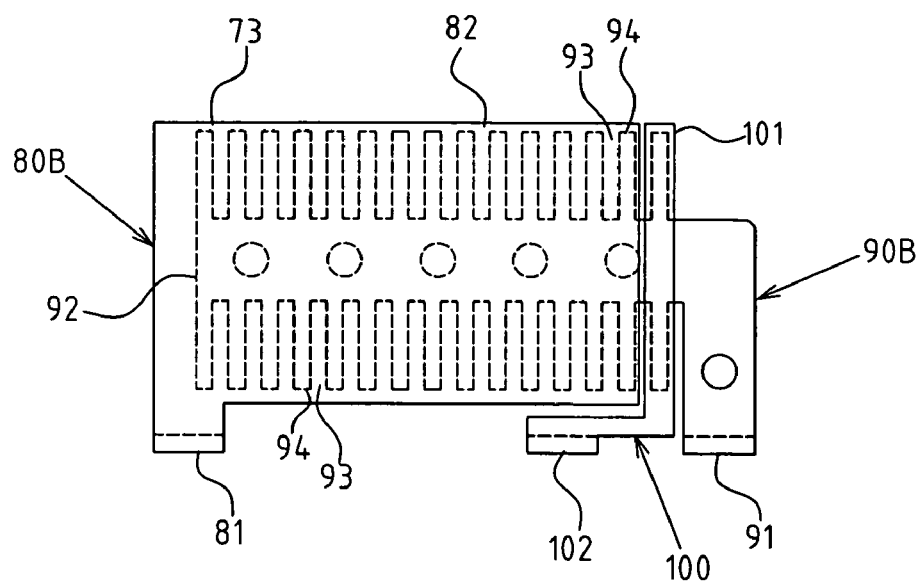
FIG. 18 shows another vertical schematic view of the transmitting strip of the present invention.
Figure 19:
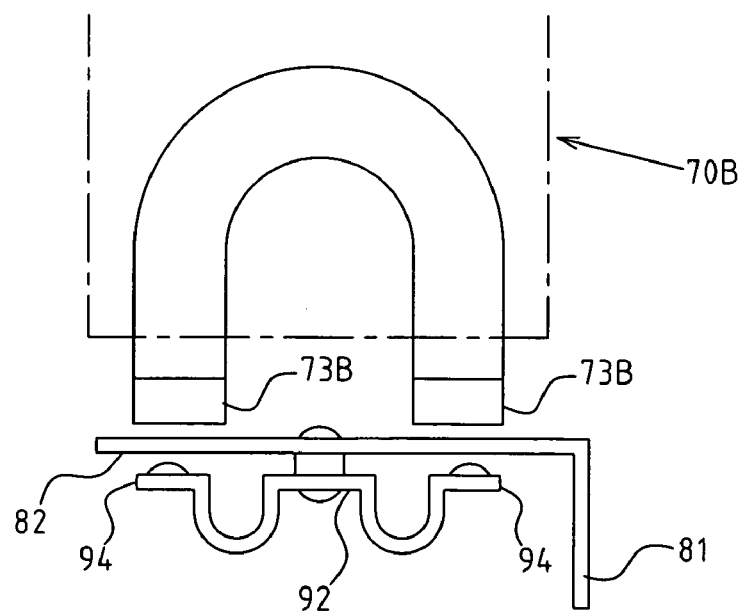
FIG. 19 shows another lateral schematic view of the transmitting strip of the present invention.

In another preferred embodiment of signal detecting device, the groove 93 and flange 94 of transmitting strip 90B can be placed at one side (referring to FIGS. 15-17), or placed at both sides (referring to FIG. 18). In such case, magnetic sucker 73B of translational drive unit 70B is designed into a bull-head structure (referring to FIG. 19). This benefit of this structure is that the number of magnetic sucker 73B can be increased at the same induction point to alleviate the probability of poor inductivity and signal tripping.

I claim:

1. A signal detecting device, comprising:
    a casing with a chamber;
    a rotary drive unit, being comprised of a drive axle protruding from said casing, and a swivel base within said chamber of said casing, said swivel base having a conducting disc that rotates synchronously with said swivel base, said conducting disc having a feeding section and a transmitting section oppositely placed at a predefined cycle of said conducting disc;
    a feeding strip, being comprised of a feeding terminal and a conducting section, said conducting section coinciding with a circular path of said feeding section of said conducting disc, a conducting section of said feeding strip being in contact with said feeding section of said conducting disc;
    a transmitting strip, being comprised of a transmitting terminal and a signal detecting section, said signal detecting section being curved and coinciding with a circular path of said transmitting section of said conducting disc, said transmitting strip being fitted with spacing grooves and spacing flanges; and
    at least one detecting unit being comprised of a detecting terminal and a signal output terminal, said detecting terminal being aligned with a predefined position on said transmitting section of said conducting disc, said detecting unit outputting a signal to a predefined controller via a signal output terminal when said transmitting section of said conducting disc contacts said detecting terminal of said detecting unit.

2. The device defined in claim 1, wherein said feeding strip and said transmitting strip are coaxially and alternatively arranged, said conducting disc being coaxially placed into said feeding strip and said transmitting strip.

3. The device defined in claim 1, wherein said feeding section and said transmitting section of said conducting disc are arranged radially together and opposite said feeding strip and said transmitting strip.

4. The device defined in claim 1, wherein said conducting section of said feeding strip and a flange of said transmitting strip are axially extended.

5. A signal detecting device, comprising:
    a translational drive unit, being comprised of a drive section and a conducting section, said translational drive unit reciprocating along a predefined path;
    a feeding strip, being comprised of a feeding terminal and a conducting section, said conducting section being installed to coincide with a shifting path of said translational drive unit, said conducting section of said feeding strip being in contact with said conducting section of said translational drive unit;
    a transmitting strip, being comprised of a transmitting terminal and a signal detecting section, said signal detecting section being installed to coincide with a path of said conducting section of said translational drive unit, said transmitting strip being fitted with spacing grooves and spacing flanges; and
    at least one detecting unit, being comprised of a detecting terminal and a signal output terminal, wherein said detecting terminal is aligned with a predefined location on a path of said conducting section of said translational drive unit, said detecting unit outputting a signal via a signal output terminal when said conducting section contacts said detecting terminal of said detecting unit.

6. The device defined in claim 5, wherein said feeding strip and said transmitting strip are horizontally and alternatively arranged.

7. The device defined in claim 5, wherein said feeding strip and said transmitting strip are horizontally and alternatively arranged, said feeding strip and said transmitting strip being mounted onto a first object, while said translational drive unit is mounted onto a second object, relative reciprocating movement of the two objects enabling a predefined reciprocating movement of said translational drive unit.

8. A signal detecting device, comprising:
    a translational drive unit, being comprised of a drive section and a detecting section, said translational drive unit reciprocating along a predefined path;
    a feeding strip, being comprised of a feeding terminal and a conducting section, wherein said conducting section is installed to coincide with a shifting path of said translational drive unit, said conducting section of said feeding strip being placed opposite said detecting section of said translational drive unit;

a transmitting strip, being placed at one side of said feeding strip away from said detecting section, said transmitting strip being comprised of a transmitting terminal and a signal detecting section, wherein said signal detecting section is installed to coincide with a path of said detecting section of said translational drive unit, said transmitting strip having spacing grooves and spacing flanges; and at least one detecting unit, being mounted laterally onto said feeding strip away from said detecting section, said detecting unit being comprised of a detecting terminal and a signal output terminal, said detecting terminal being aligned with a predefined location on a path of said detecting section of said translational drive unit.

9. The device defined in claim 8, wherein said feeding strip and said transmitting strip are placed onto a first object, wherein said translational drive unit is mounted onto a second object, relative reciprocating movement of the two objects enabling a predefined movement of said translational drive unit.

10. The device defined in claim 8, wherein a groove and a flange of said transmitting strip are arranged at one side or both sides thereof.

11. The device defined in claim 8, wherein said detecting section of said translational drive unit forms a magnetic sucker, said signal detecting section and detecting terminal presenting a magnetic property or magnetic conductivity, said detecting terminal stopping at said conducting section of said feeding strip, when said magnetic sucker is aligned with said detecting terminal of said detecting unit, enabling electrical connection of said detecting unit and said feeding strip, said detecting unit outputting a signal via a signal output terminal thereof.

* * * * *